June 21, 1932. W. H. BYRD 1,863,831
INK ROLLING MILL
Filed Aug. 31, 1929 7 Sheets-Sheet 6
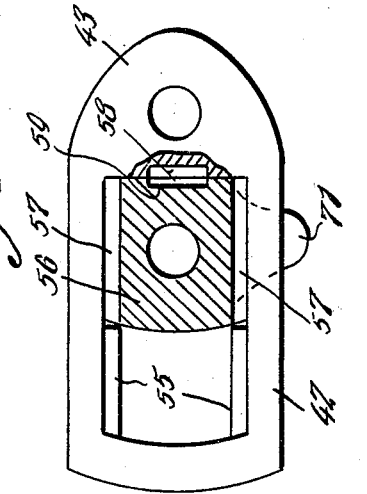
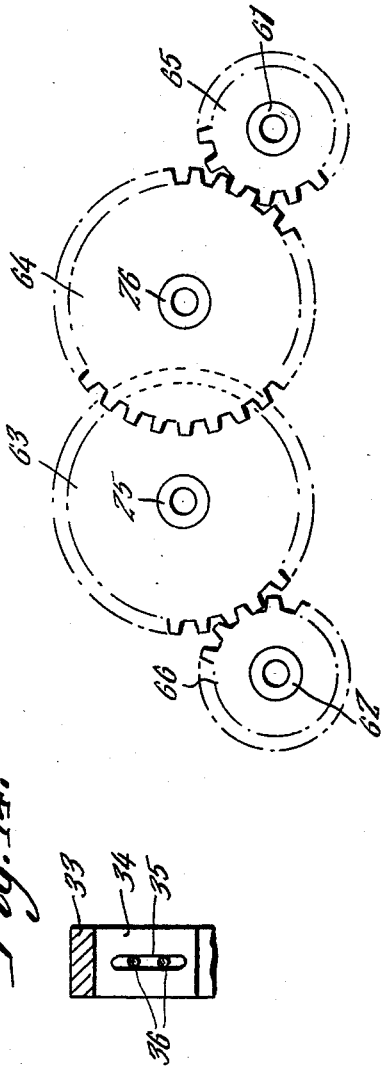
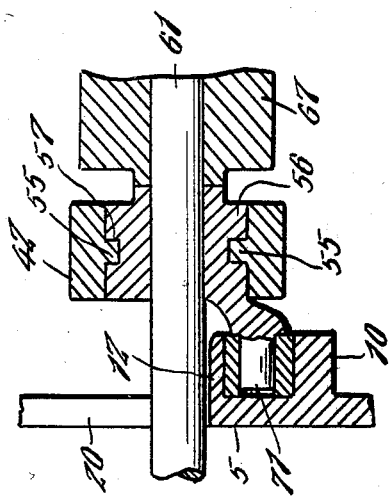
Inventor
W. H. Byrd
By Clarence A. O'Brien
Attorney

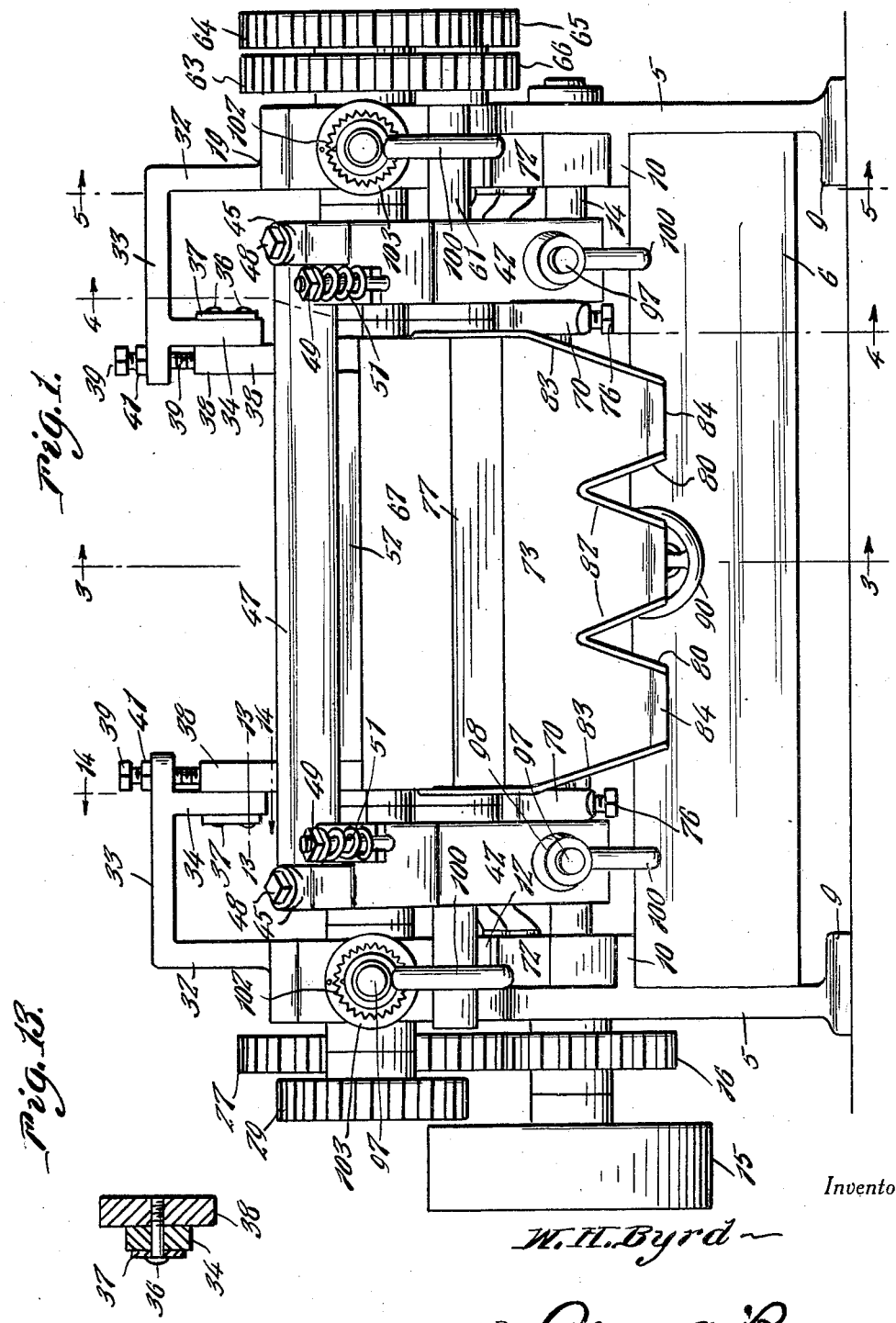

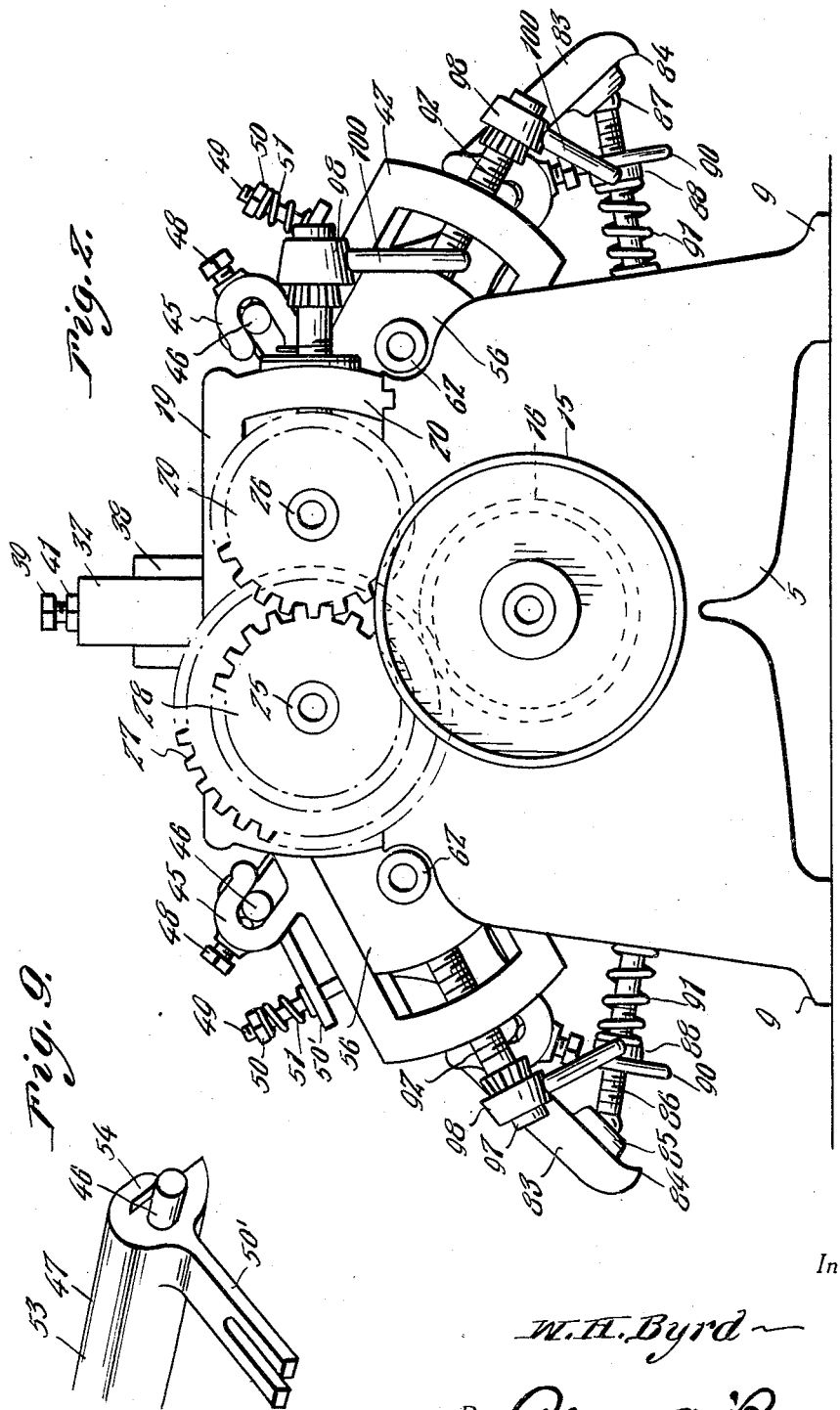

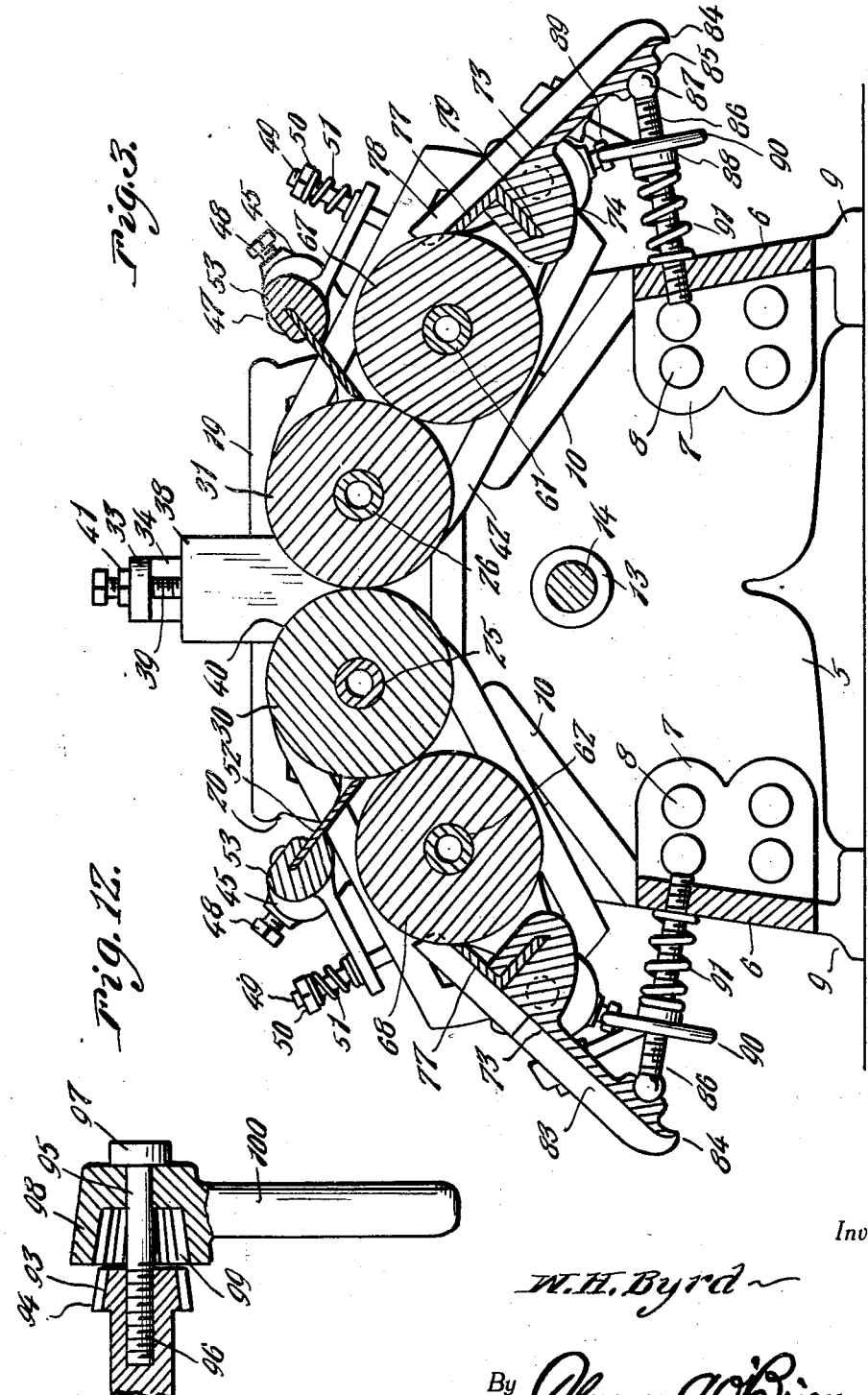

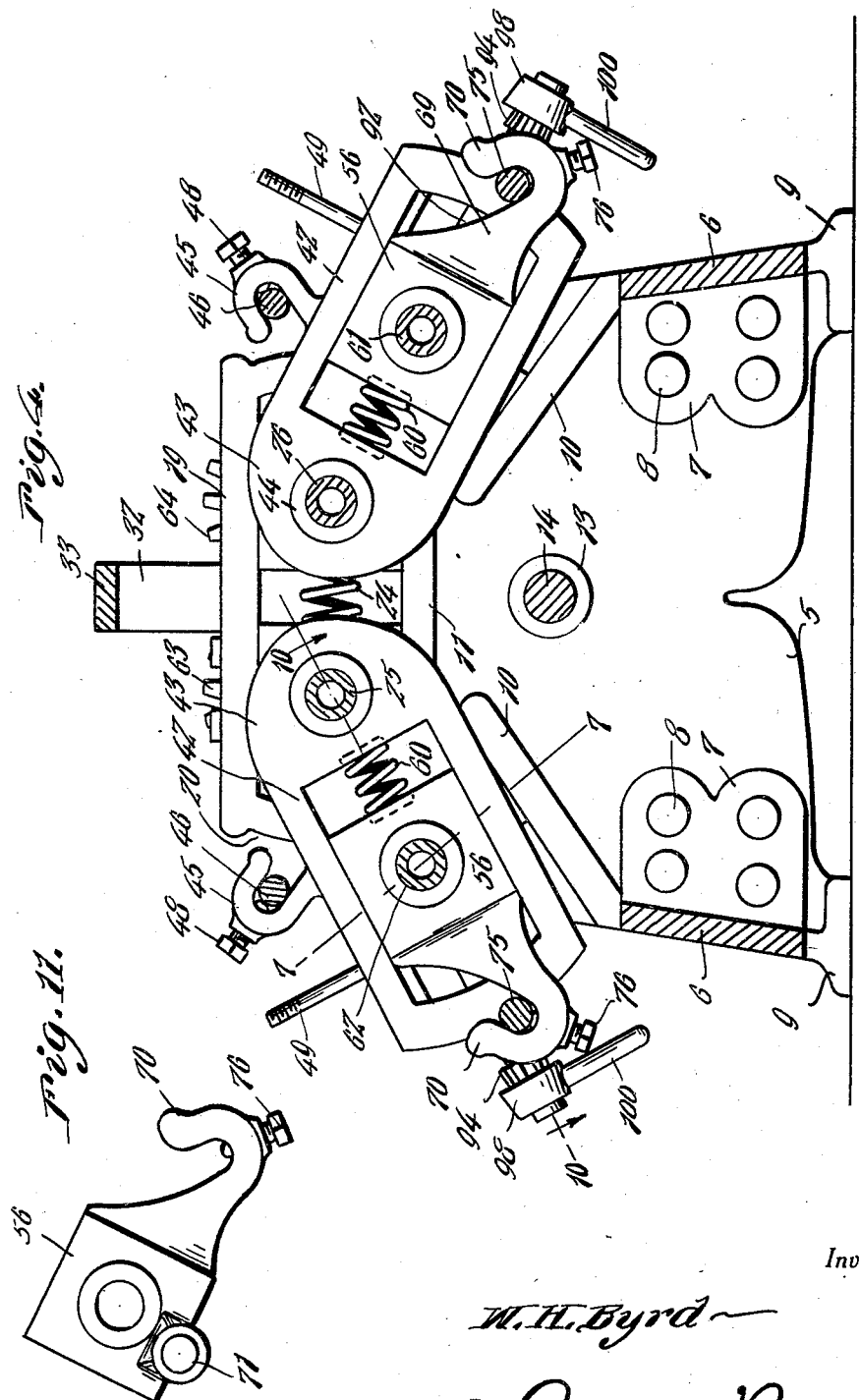

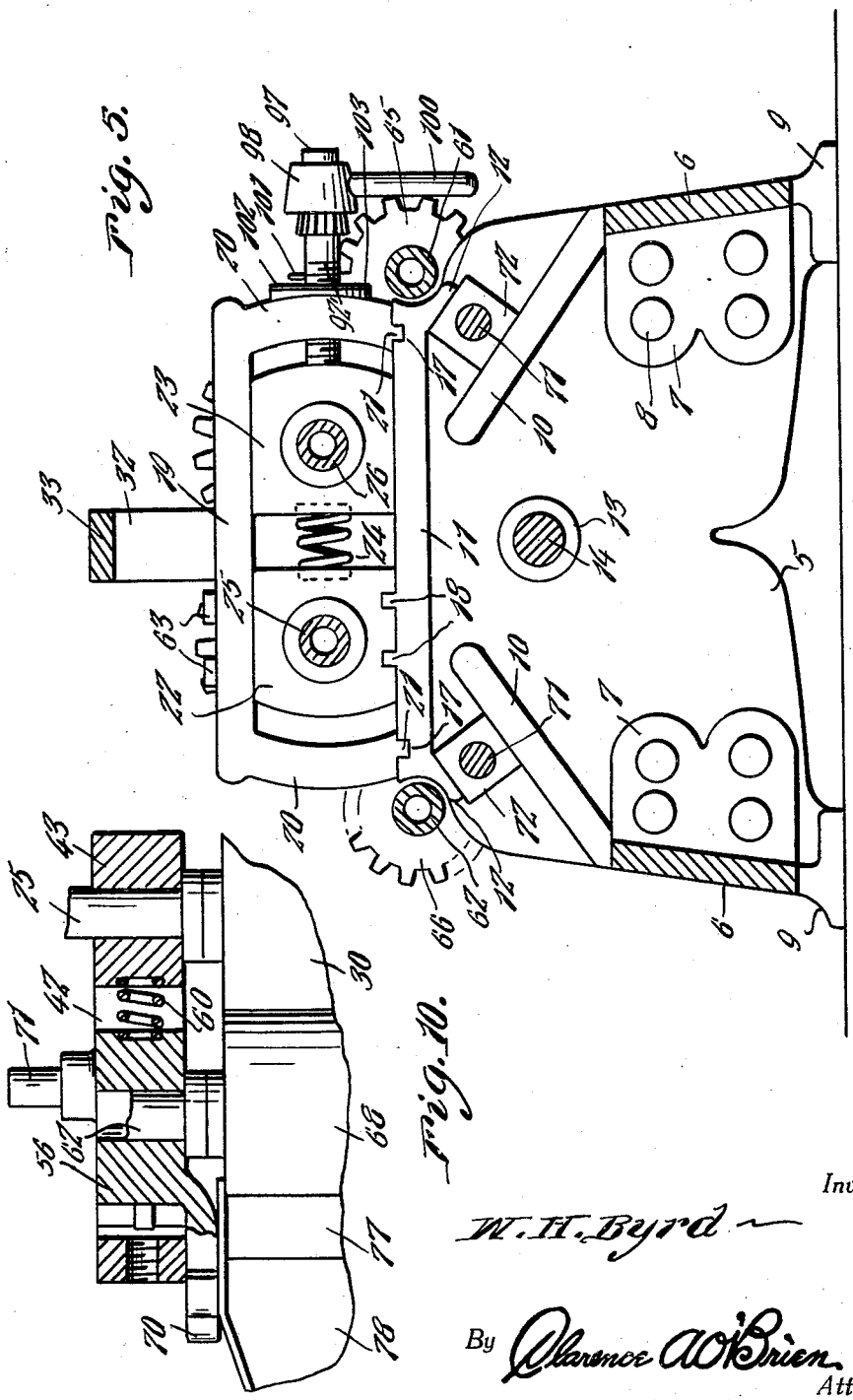

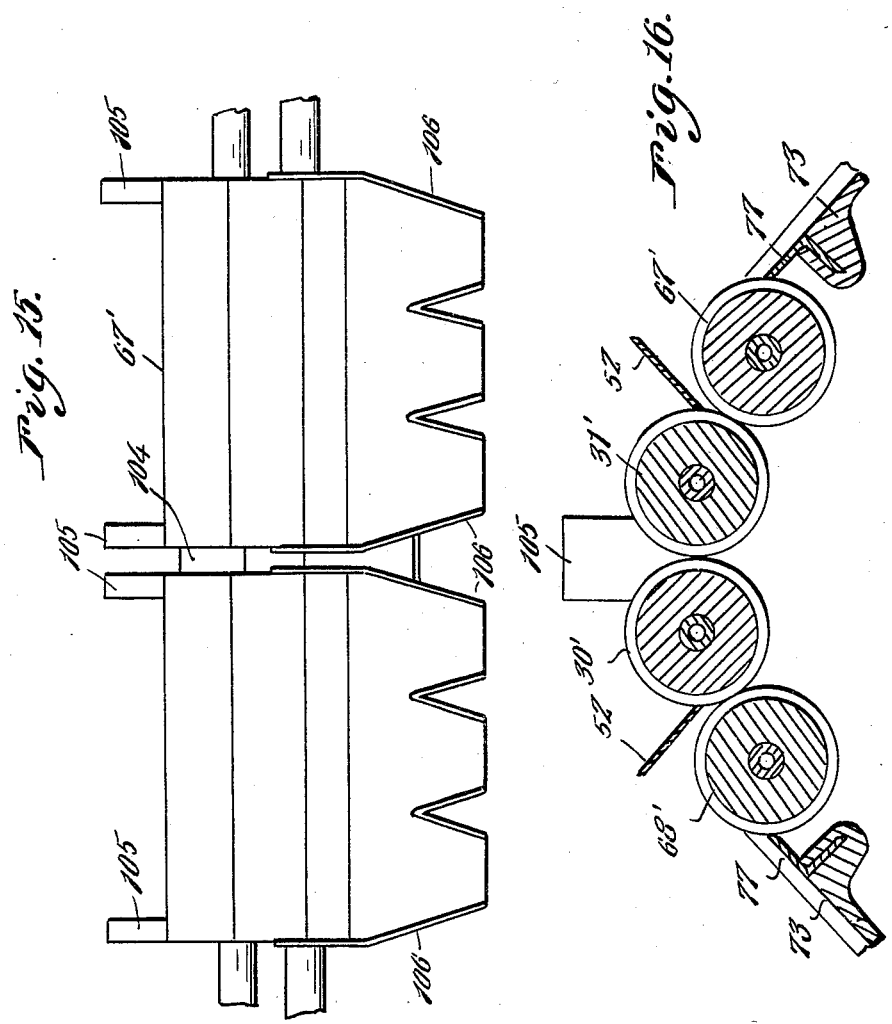

Patented June 21, 1932

1,863,831

UNITED STATES PATENT OFFICE

WILLIAM H. BYRD, OF NEW ORLEANS, LOUISIANA

INK ROLLING MILL

Application filed August 31, 1929. Serial No. 389,793.

This invention appertains to new and useful improvements in mills especially adapted for grinding or rolling ink from it granular constituency to a paste form.

In machines of this character now in use, great difficulty is experienced in properly setting the rolls so that there will be uniform pressure. It is the principal object of this invention to provide an ink rolling mill wherein adjustment may be readily made to permit the rolling of various grades of ink with extreme ease and in a simple manner.

Another important object of the invention is to provide a mill of the character stated wherein the various parts are capable of quick assembly or disassembly to permit repairs and replacements.

Another important object of the invention is to provide a mill wherein adjustable knives are provided for removing the paste film from the rolls.

During the course of the following specification and claims, numerous other important objects and advantages of the invention will readily become apparent.

Furthermore, it is to be understood that while the following description sets forth the invention in definite terms, numerous changes in the shape, size and materials may be resorted to without departing from the spirit and scope of the invention as claimed hereinafter.

In the drawings:

Figure 1 represents a side elevation of the novel machine.

Figure 2 represents an end elevation of the mill.

Figure 3 represents a vertical transverse sectional view taken substantially on line 3—3 of Figure 1.

Figure 4 represents a vertical transverse sectional view taken substantially on line 4—4 of Figure 1.

Figure 5 represents a vertical transverse sectional view taken substantially on line 5—5 of Figure 1.

Figure 6 diagrammatically illustrates the driving gears in mesh.

Figure 7 represents a sectional view taken substantially on line 7—7 of Figure 4.

Figure 8 represents elevational and partial sectional views through one of the roller guides showing its bearing block about to be engaged with the retaining means of the guide.

Figure 9 represents a fragmentary perspective view of the knife carrier.

Figure 10 represents a fragmentary sectional view taken substantially on line 10—10 of Figure 4.

Figure 11 represents a side elevation of one of the adjustable bearing blocks for the rolls.

Figure 12 represents a fragmentary sectional view through one of the adjustable bearing block feed devices, showing the handle in disengaged position.

Figure 13 represents a sectional view taken substantially on line 13—13 of Figure 1.

Figure 14 represents a fragmentary sectional view taken substantially on line 14—14 of Figure 1.

Figure 15 represents a side elevation disclosing modified aprons for selecting the rolled ink from rolls of modified form.

Figure 16 represents a vertical transverse view through a machine consistent with the present invention but provided with somewhat modified roll constructions.

Figure 17 is a fragmentary detail sectional view.

Referring to the drawings wherein like numerals designate like parts, by first referring to Figure 5, it will be seen that the machine includes end walls 5 connected together in spaced relation by the side walls 6—6. The side walls are flanged at their ends as at 7 and suitable rivets 8 firmly secure the flanges 7 to the end walls in the manner shown. The lower corners of the end walls are constructed as to provide feet 9 for stably supporting the structure, which in side elevation is disclosed in Fig. 1.

The end walls are each provided with a pair of upwardly converging shoulders 10—10, while the upper edge of the respective end walls are provided with inwardly disposed flanges 11. The ends of each flange 11 is provided with an outwardly declining projection 12 disposed in substantial parallelism with respect to its corresponding shoulder 10.

Journalled through the bearings 13 in the end walls 5 is the shaft 14, which projects outwardly at one end beyond one end wall 5 and is equipped with the power pulley 15. The shaft 14 is also provided with a gear 16 in close proximity to the pulley 15 and the driving connection of this gear with the rolls of the machine will be fully described hereinafter.

The top surface of the flange 11 of each end wall 5 has a transversely extending groove 17 at each end thereof and a pair of transversely disposed tongues 18—18 in close proximity to each other and adjacent one end of the flange, all provided as in the manner substantially shown in Figure 5.

A substantially U-shaped guide 19 is disposed inversely upon each end wall 5 and the end of each depending leg portion 20 is provided with a tongue 21 for engagement in the corresponding channels 17. Disposed within the guide 19 are the bearing blocks 22 and 23, the block 22 being provided with transversely extending grooves therein to receive the tongues 18—18, thus maintaining the block 22 stationary, while the block 23 is capable of reciprocatory movement.

The opposed sides of the blocks 22 and 23 are recessed to receive the end portion of a compressible coiled spring 24. A shaft 25 has its ends disposed through the corresponding bearing blocks 22 at the respective ends of the machine. A hollow shaft 26 has its ends journalled through the corresponding block 23 at the respective end of the machine and as shown in Figure 2, the shaft 25 projects beyond one of the blocks 22 and is equipped with the gears 27 and 28. The gear 27 is adapted to mesh with the drive gear 16, while the gear 28 meshes with the gear 29 suitably secured to the projecting end of the shaft 26.

It will be observed that the shafts are hollow so that they may be water cooled in any suitable manner now known in the art. As is shown in Figure 3, the shaft 25 carries a roll 30, while a roll 31 circumscribes the shaft 26.

The top of each inverted U-shaped guide 19 is provided with an arm which extends upwardly as at 32 and inwardly as at 33, the end portion being provided with a dependency 34. The dependency 34 is provided with a vertical slot 35 therein (see Figure 14) and screws 36 disposed through a plate 37 are screwed into threaded openings of a plate 38, (see Figure 3). A set screw 39 is adapted to be fed through the end portion of the horizontal part 33 of the aforementioned arm to impinge against the said plate 38 so as to drive the deformed end portion 40 of the plate against the co-acting rolls 30 and 31.

A jamb nut 41 is provided for maintaining the set screw in an adjusted position. The deformed end portion of the plate 38 is so constructed that it will fit snugly against the rolls 30 and 31 to prevent ink from passing outwardly beyond the ends of the rolls.

It will be observed, that the present invention permits the rolled ink to be discharged at the opposite sides of the machine and to this end a pair of rectangular guides 42—42 are provided at each side of the machine. Figure 1 shows the front side of the machine and the rear side is of substantially identical construction, each of the guides 42 having one end provided with a solid head 43.

In describing the mechanism at the front side of the machine for rolling and discharging the ink, it will be observed that the shaft 26 is journalled through the bearing 44 at the head portion of the guide 42. In other words, each end portion of the shaft 26 passes through one of the heads 43. The upper portion of each guide 42 is provided with a hook 45 for engagement over the corresponding pintle 46 on the scraper blade carrier, which in the drawings is generally referred to by numeral 47. Each hook 45 is provided with a set screw 48 which is adjustable against the pintle 46 in the manner clearly shown in Figure 4.

Each of the corresponding guides 42 is provided with an upstanding threaded stem 49 for disposition through the bifurcated shank 50 of the blade carrier 47. As is clearly shown in Figure 3, a nut may be engaged on the threaded portion of the stem and may be tightened against the spring 51 which spring impinges against the shank 50 so as to tensionally maintain the blade carrier in the position shown in Figure 3 with its blade 52 bearing with equal pressure throughout its entire length against the roll 31.

As is shown in Figure 9, the body 53 of the carrier is provided with a slot 54 for receiving the butt end of the blade 52 in a rigid manner.

Each of the guides 42 has a pair of opposed tongues 55 disposed in parallel spaced relation and extending for substantially one-half of the open area of the guide so that the adjustable bearing block 56 may be positioned within the guides, as in the manner shown in Figure 8, to permit its engagement with the said tongues 55—55. The block 56 is provided at opposite sides with the grooves 57 for receiving the said tongues 55 and by engaging the block into the guide in the manner shown, and shifting the same so that the tongues 55—55 engage with the grooves 57, the bearing block will be prevented from lateral displacement.

As is clearly shown in Figure 8, the head 43 of the guide is provided with a socket 58 at its inner side in opposed relation to the socket 59 in the opposed face of the guiding block 56, and by engaging the ends of a compressible spring 60 in the sockets 58 and 59, as in the manner shown in Figure 4, the block will be tensionally urged to a position against the opposite end of the guide.

At one side of the machine, a shaft 61 has its ends journalled through the corresponding bearing blocks 56, while at the rear side of the machine, a shaft 62 has its ends journalled through the corresponding pair of bearing block 56. The shafts 61 and 62 are hollow to permit water cooling and project beyond the end of the machine opposite to the end thereof where the gears 28 and 29 are located.

At this end of the machine the shafts 25 and 26 are equipped with gears 63 and 64 respectively, while the shafts 61 and 62 are equipped with relatively small gears 65 and 66 respectively, in mesh with the gears 64 and 63 respectively. It is thus seen that the rolls 67 and 68 on the shafts 61 and 62 respectively are driven at a much less rate of speed than the rolls 31 and 30.

Each bearing block 56 is provided with an offset shank 69 which terminates in an upwardly disposed hook 70. Each bearing block 56 is also provided with a laterally extending pintle 71 which engages into an opening in a corresponding block 72, which block is interposed between one of the shoulders 10 and its corresponding projection 12. The block 72 snugly fits between these details and is thus prevented from rotation.

At each side of the machine there is an apron 73, which has a longitudinally extending shoulder 74 at its under side and from the ends of this shoulder 74 extend pintles 75 for rest in the hooks 70. Minute adjustments of the apron may be obtained by adjusting the set screws 76 on the said hook 70. The apron 73 has a roll engaging extension 77 flanged at its ends as at 78 and suitably bevelled at its roll engaged edge for scraping the ink from the corresponding roll. The opposite longitudinal edge of the extension is provided with a laterally disposed flange 79, which is anchored in the shoulder 74 of the apron as in the manner clearly shown in Figure 3.

The apron is of integral construction, the same being notched out as at 80 and 81 in such a manner and stamped in such a way as to provide the V-arranged flanges 82, one for each notch. The lower corners of the apron 73 are cut on a line converging with the adjacent legs of the flanges 82—82 and these edge portions of the apron are provided with flanges 83. The outlets 84 are bent downwardly as in the manner shown in Figure 3 and beneath each of these outlets may be disposed a bucket or some suitable receptacle. Of course, a central receptacle may be placed so as to receive the discharge from all of the outlets if desired.

The aprons at the opposite sides of the machine are provided at their inner sides with sockets 85, each apron preferably having only one socket but more if desired to accommodate additional adjusting means which will be described hereinafter. This means includes for each apron, a threaded bar 86, one end of which is threadedly engaged through an opening in one of the side walls 6 of the machine. The opposite end of the threaded bar is provided with a ball head 87 for disposition within the corresponding socket 85.

A collar 88 circumscribes the threaded bar 86 and is maintained against movement by an arm 89. A hand wheel 90 is seatable on the bar 86 and against the said collar 88, while a compressible spring 91 is interposed between the said collar 88 and the corresponding side walls 6. It is obvious that by rotating the wheel 90 in a given direction, the apron 73 may be adjusted so as to dispose the roll engaging extension 77 thereof properly against the corresponding roll.

For feeding the bearing block 56 within the guide 42, a screw 92 is threadedly disposed through one end of the guide and equipped with a bevelled head 93 at its outer end. This head is provided with ribs or teeth 94 also arranged in a cone formation.

A shank 95 has one end threadedly engaged into the screw 92 as at 96 and is provided with a head 97 at its outer end. A hollow frusto-conical shaped cup 98 is provided with internal teeth 99 engageable with the ribs or teeth 94. This cup 98 is provided with a handle 100 whereby the cup may be reciprocated on the shank 95 for engagement or disengagement with respect to the teeth 94. By engaging the cup 98 with the teeth 94 of the screwhead and rotating the handle 100, the screw 92 in exerting pressure against the block 56 will urge the same against the action of the spring 60 so as to regulate the relationship of the corresponding roll 31 and 67 at the front of the machine.

This same arrangement for adjusting the block 56 is provided for adjusting the block 23, as shown in Figure 5, excepting that the screw 92' has a pin 101 projecting therefrom to act as a pointer for indicating relative position of the screw with respect to a dial 102 on the annular plate 103, suitably secured to one leg 20 of the guide 19. The operation of the screw is identical with the same and a description of the means for adjusting the block 56 will suffice for the same means for actuating the block 23.

A modified form of roll is disclosed in figure 15 wherein the roll generally referred to by numeral 67' is divided into sections by longitudinally spaced circumferentially extending grooves 104. Partition plates 105 are provided for the ends of each roll section and an individual take-off apron generally referred to by numeral 106 is provided for each roll section. These aprons 106 are constructed in substantially the same manner as the aprons before described, excepting that they are of shorter length and that there are a greater number to correspond with the number of sections on the roll 67'.

By means of this arrangement, inks of different grades or of different color may be simultaneously rolled without liability of intermixture.

It is to be understood that while the foregoing description sets forth the elements specifically, various changes in the shape of parts, materials, and size may be resorted to without departing from the spirit and scope of the invention as claimed hereinafter.

It will be noted in Figure 16 as well as in Figure 3 that the blade 77 has its flange 79 also bevelled at its longitudinal edge, so that the blade may be detached from the shoulder 74 and reversed so that the flange 79 will be disposed in the position the blade 77 is now shown, thus providing a double edged blade, permitting longer use without repair.

Furthermore, it will be observed that the two discharge rolls 67 and 68 pick up the ink removed by the knives 52 to prevent the regrinding of the same between the rolls 30 and 31. By way of comparison, let it be understood that the present invention uses four knives and two discharge aprons as compared with other ink mills now in use wherein one apron and one knife enables the machine to increase the output from between three and four times that of conventional types of mills.

It will also be observed that the employing of two feed rolls (namely rolls 30 and 31) rotating in opposed directions permit the ink to feed away towards opposite sides of the machine thus affording a discharge at the front and rear side of the machine, which has not been embodied in any machine now in use.

In adjusting the rolls, rolls 30 and 31 are first adjusted perfectly, after which rolls 67 and 68 are adjusted, and in this manner there is no strain tending to throw the rolls previously adjusted out of line with the frame or with each other. The entire machine permits a perfection of adjustment each succeeding adjustment not interfering in any manner with previous adjustments.

The grooving of the rolls (as shown in Fig. 15) and the special construction of the sectional apron permits the simultaneous rolling of several different ink colors and the particular partition arrangement disposed within the groove, which while preventing ink from adjoining troughs to flow into each other will take care of any ink that might accidentally pass over one of the partitions 106. The space between the partition 106 is sufficient to permit the insertion of a knife or some other suitable tool to remove any ink deposit therein.

Obviously, the cans in which the ink is to be sold may be positioned immediately below the outlets 84, thus eliminating the time and expense that would be incurred otherwise by collecting the ink in large containers and subsequently filling the cans therefrom.

Having described the invention, what is claimed as new is:

1. An ink rolling mill comprising a pair of upper stationary rolls, and an adjustable lower roll for each upper stationary roll, a water cooled shaft for each of said rolls, a bearing block for the shaft of each of the said adjustable rolls, a swingably supported guide for each of the blocks, and means for adjusting the said guide.

2. An ink rolling mill comprising a pair of upper stationary rolls, and an adjustable lower roll for each upper stationary roll, a water cooled shaft for each of said rolls, a bearing block for the shaft of each of the said adjustable rolls, a swingably supported guide for each of the blocks, and means for adjusting the said block within the guide.

3. An ink rolling mill comprising a pair of upper stationary rolls, and an adjustable lower roll for each upper stationary roll, a water cooled shaft for each of said rolls, a bearing block for the shaft of each of the said adjustable rolls, a swingably supported guide for each of the blocks, and screw means for adjusting the said block, said means comprising a screw disposed through one end of each guide and for engagement against the corresponding block, the outer end of the screw being provided with a conical shaped toothed head, a shank extending from the head, a cup slidable on the shank, and provided with internal teeth engageable with the teeth of the screwhead, and a handle on the cup for shifting the cup on the shank and for rotating the said cup.

4. In a mill of the character described comprising grinding rolls, said grinding rolls being provided at predetermined intervals with circumferentially extending grooves, partition plates for engagement between the rolls and opposite sides of each groove, an apron extending away from one of the rolls, a pair of partitions extending transversely on the apron, the inner ends of the partitions of the aprons being disposed within one of the grooves, and a plurality of outlets on each apron.

5. In a mill of the character described comprising a pair of grinding rolls, each of said rolls being provided with a circumferential groove at its intermediate portion, a partition extending downwardly to contact with the rolls at each side of their grooves, a partition at each end of the rolls in contact with said rolls, and a discharge apron leading off from one of said rolls.

6. In a mill of the character described comprising a pair of grinding rolls, each of said rolls being provided with a circumferential groove at its intermediate portion, a partition extending downwardly to contact with the rolls at each side of their grooves, a partition at each end of the rolls in contact with said rolls, and a discharge apron leading off from one of said rolls, the discharge apron being provided with a pair of closely spaced parallel partitions extending toward the roll, and having its inner end disposed within the said grooves thereof.

In testimony whereof I affix my signature.

WILLIAM H. BYRD.